Patented Sept. 12, 1950

2,521,811

UNITED STATES PATENT OFFICE 2,521,811

AMINE DERIVATIVES OF CHLOROMETHYL DIHYDROSAFROL

Herman Wachs, Brooklyn, N. Y., assignor to U. S. Industrial Chemicals, Inc., New York, N. Y., a corporation of Delaware No Drawing. Application April 27, 1949, Serial No. 90,041. In Brazil March 26, 1947

5 Claims. (Cl. 260—247)

This invention relates to new products which are useful insecticides and synergists for pyrethrins.

The products of the invention are prepared from chloromethyl or bromomethyl dihydrosafrol and various amines, namely, primary and secondary alkylamines having from one to eight carbon atoms in each alkyl radical, cyclohexylamine, morpholine and piperidine, with a splitting off of the appropriate halogen hydride.

Chloromethyl and bromomethyl dihydrosafrol are materials having the generic formula

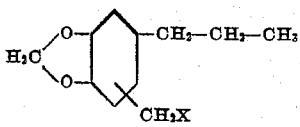

in which X is the chlorine or bromine atom, and they may be prepared in accordance with the teachings of my copending application, Serial No. 658,872, filed April 1, 1946, now Patent 2,485,680, October 25, 1949, of which application the present application is a continuation-in-part.

Amines which may suitably be used in preparing the products of the present invention are methylamine, dimethylamine, methyl ethyl amine, ethylamine, diethylamine, n-butylamine, di-n-butylamine, 2-ethylhexylamine, di-2-ethylhexylamine, etc.

The new products are suitably prepared by contacting the reactants when in solution in a low-boiling aromatic solvent, such as benzene, toluene or the xylenes, using at least about two moles of amine per mole of chloromethyl or bromomethyl dihydrosafrol and recovering the product by distilling it from the reaction mixture. For example, when a primary alkylamine and chloromethyl dihydrosafrol are used as reactants, the reaction may be illustrated by the following equation:

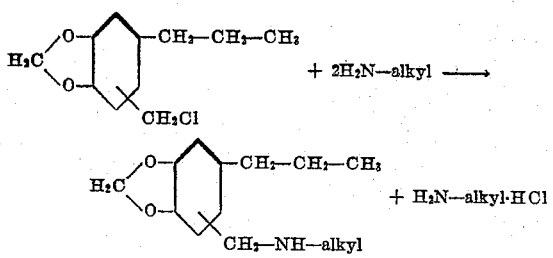

The following examples illustrate the preparation of various products falling within the scope of this invention.

Example I

The cyclohexylamine reaction product was prepared as follows: 52.5 grams (0.53 mole) of cyclohexylamine was dissolved in 23 grams of benzene, 53 grams (0.265 mole) of chloromethyl dihydrosafrol was added under cooling, the mixture was allowed to stand for two hours, and was thereafter refluxed on a steam bath. Water was then added, the oil was separated, benzene distilled off, and steam was passed through the remainder to remove excess cyclohexylamine. The main product was distilled in vacuo at 174–180° and 2 mm. It is an odorless, somewhat viscous oil, turning yellow on standing.

The product prepared as described was an effective insecticide and synergist for pyrethrins. Thus, when used with pyrethrins in the proportions of 30 mg. of pyrethrins and 300 mg. of the product in 100 ml. of odorless kerosene, the knockdown at the end of 10 minutes was 95.3% and the kill at the end of 24 hours was 43.1% on houseflies in the Peet-Grady test, whereas the O. T. I. (100 mg. of pyrethrins in 100 ml. of odorless kerosene) gave a knockdown of 97.4% and a kill of 42.4% under the same test conditions.

Example II

The morpholine reaction product was prepared as follows: To 53 grams (0.265 mole) of chloromethyl dihydrosafrol dissolved in 50 ml. of benzene was slowly added with cooling a solution of 53 grams (0.61 mole) of morpholine dissolved in 50 ml. of benzene. The reaction commenced and a solid fraction separated, after which the mixture was refluxed for four hours. The mixture was then cooled and washed with water to remove the hydrochloride salt of morpholine, and the solid fraction was thereafter separated and steamed to remove excess morpholine. The solid reaction product, after drying, analyzed 5.26% nitrogen calculated (4.84%).

The product prepared as described was an effective insecticide and synergist for pyrethrins. Thus, when used with pyrethrins in the proportions of 30 mg. of pyrethrins and 1000 mg. of the product in 100 ml. of odorless kerosene, the knockdown at the end of 10 minutes was 94% and the kill at the end of 24 hours was 94% on houseflies in the Peet-Grady test, whereas the corresponding figures for the O. T. I. were 96% and 33%.

Example III

The dibutylamine reaction product was prepared as follows: 68 grams (0.53 mole) of dibutylamine was dissolved in 23 grams of benzene, 53 grams (0.265 mole) of chloromethyl dihydrosafrol was added during cooling, the mixture was allowed to stand for one hour and was then refluxed for four hours. Water was then added, the oil was separated, the benzene distilled off, then steam passed through the remainder to remove excess dibutylamine. The main product distills in vacuo at 171–174° and 3.7 mm. It is an odorless, viscous oil, turning slightly yellow on standing.

The products of this invention may be employed alone or as synergists for pyrethrins in the conventional types of commercial insecticides. For example, they may be employed in solution in kerosene, as has been described, or they may be used as an active ingredient of insecticidal dusts. Thus, a suitable dust may be prepared by incorporating 2.5% of the product and 0.2% of pyrethrins into a carrier such as exhausted pyrethrum flowers, and thereafter diluting the carrier with three or four parts of talc.

I claim:

1. The compounds of the generic formula

in which A is an N-linked radical selected from the group consisting of monoalkylamino and dialkylamino radicals having from one to eight carbon atoms in each alkyl radical, cyclohexylamino radicals, morpholinyl radicals and piperidyl radicals.

2. The compounds of claim 1 in which A is a dialkylamino radical.
3. The compounds of claim 1 in which A is a di-n-butylamino radical.
4. The compounds of claim 1 in which A is a cyclohexylamino radical.
5. The compounds of claim 1 in which A is a morpholinyl radical.

HERMAN WACHS.

No references cited.